RANDOM ACCESS STORAGE AND RETRIEVAL DEVICE WITH LOOK AHEAD

Filed March 20, 1967

4 Sheets-Sheet 1

INVENTOR.
EUGENE H. IRASEK
BY Zulwider, Patton, Rieber, Lee, and Utecht
ATTORNEYS

RANDOM ACCESS STORAGE AND RETRIEVAL DEVICE WITH LOOK AHEAD

Filed March 20, 1967

INVENTOR.
EUGENE H. IRASEK
BY Fulwider, Patton, Rieber Lee, and Utecht
ATTORNEYS INVENTOR.
EUGENE H. IRASEK
BY Fulwider, Patton, Rieber
Lee, and Utecht
ATTORNEYS Dec. 9, 1969 E. H. IRASEK 3,482,687

RANDOM ACCESS STORAGE AND RETRIEVAL DEVICE WITH LOOK AHEAD

Filed March 20, 1967 4 Sheets-Sheet 4

INVENTOR.
EUGENE H. IRASEK
BY Fulwider, Patton, Rieber Lee, and Utecht
ATTORNEYS United States Patent Office 3,482,687
Patented Dec. 9, 1969

3,482,687

RANDOM ACCESS STORAGE AND RETRIEVAL DEVICE WITH LOOK AHEAD

Eugene H. Irasek, Inglewood, Calif., assignor, by mesne assignments, to HF Image Systems, Inc., Los Angeles, Calif., a corporation of California Filed Mar. 20, 1967, Ser. No. 624,386
Int. Cl. B07c 9/00
U.S. Cl. 209—80.5 12 Claims

ABSTRACT OF THE DISCLOSURE

A random access storage and retrieval device for a large number of items such as cards and the like in which the items are individually identifiable, are located in random positions, and may be recalled independently of other items and in any desired order regardless of their location in the store. A combination withdrawal-return gate is provided and a new card is recalled and brought to the withdrawal portion of the gate while a previously recalled card remains withdrawn from the store.

CROSS-REFERENCE TO RELATED APPLICATION

The disclosure herein incorporates features disclosed and claimed in applicant's copending applications, Ser. No. 528,231 filed Feb. 17, 1966, now Patent No. 3,429,436 for Random Access Storage and Retrieval Device, and Ser. No. 612,468 filed Jan. 30, 1967, for Random Access Storage and Retrieval Device with Activity Orientation.

BACKGROUND OF THE INVENTION (1) The present invention is directed to a random access storage and retrieval device for a large number of items such as cards or the like, which items are individually identifiable and may be located randomly in the store without regard to their position relative to other items. The device includes means for addressing a desired item and automatically selecting the addressed item, removing the addressed and selected item from the store, and returning a withdrawn item back to the store after use.

(2) In applicant's copending applications above-identified, a selected and withdrawn item is returned to the store before the next desired item is located in withdrawal position. This unnecessarily extends the overall operating time because the operations of the card spreaders and the movement to withdrawal position take place subsequent to the return of the previously withdrawn card to the store. In the device according to the present invention the operating time is condensed to a material degree by addressing, selecting and positioning the next desired card in withdrawal position while the previous card is still withdrawn from the store and being used. This addressing, selecting and positioning therefore takes place during what was previously dwell time while the first card was being used for display, reproduction or whatever other use was made thereof. When the use of the withdrawn card is completed it is returned to the store with the next card already positioned for withdrawal and the first card is returned and the second card withdrawn immediately thereafter without manipulation of the card spreaders nor relative transverse movement between the withdrawal mechanism and the card store.

SUMMARY OF THE INVENTION

For ease in terminology in describing the present invention the items to be stored are referred to generally as "cards" which term is intended to cover many different types of items including, without limitation, ledger cards, magnetic cards, optical cards, punch cards, tapes, keys, slides, film cards, microfiche, microfilm jackets and the like, one specific example being a film sheet "card" carrying as many as 100 or more individual film images or the like thereon.

As described in applicant's copending applications above-identified, an individual card to be recalled from the store is addressed by its unique notch coding, is identified in a selector, is stopped by a sensor in a withdrawal-return station or gate, and is thereafter manipulated by an X–Y positioning mechanism or other handling means to withdraw the card from the store and to return it back into the store after use In the first application above-identified, the card is returned to the same position relative to the other cards which it occupied before withdrawal and in the second application the cards are all returned to substantially the same position in the store to locate the more frequently used cards adjacent thereto. According to the present invention, while a first recalled card remains withdrawn from the store, the next desired card is addressed, selected and positioned at the withdrawal portion of the station or gate during the dwell period while the first card is in use for projection, reproduction or other manipulation.

It is, then, a primary object of the present invention to provide an improved random access storage and retrieval device having reduced operating time by selecting and positioning for withdrawal the next desired card during the dwell time in which a previously recalled card is in use. In the furtherance of this object the device provides for the return of a withdrawn card and the immediate withdrawal of the next desired card by the card-manipulating mechanism without relative transverse movement between the store and mechanism. After withdrawal of the second card, a third card desired thereafter is selected and positioned in withdrawal position during the dwell period in which the second card is in use. The device therefore effects a considerable saving in operating time by performing a look-ahead or preparatory operation in positioning for withdrawal the next card to be recalled while the previously recalled card is in use so that the return of the used card and immediate withdrawal of the next card can be accomplished without intervening movements or operations.

While the inventive concept is shown in a preferred embodiment incorporating structure and features described and claimed in applicant's copending applications above-identified, it will be understood that the basic concept and the application thereof to random access storage and retrieval devices may assume different structural embodiments within the scope of the invention which lies in the more general concept of the objects and features hereinbefore pointed out and others which will be apparent to those skilled in the art from the following specification and the appended drawings.

DESCRIPTION OF THE PREFERRED EMBODIMENT

Figure 1:
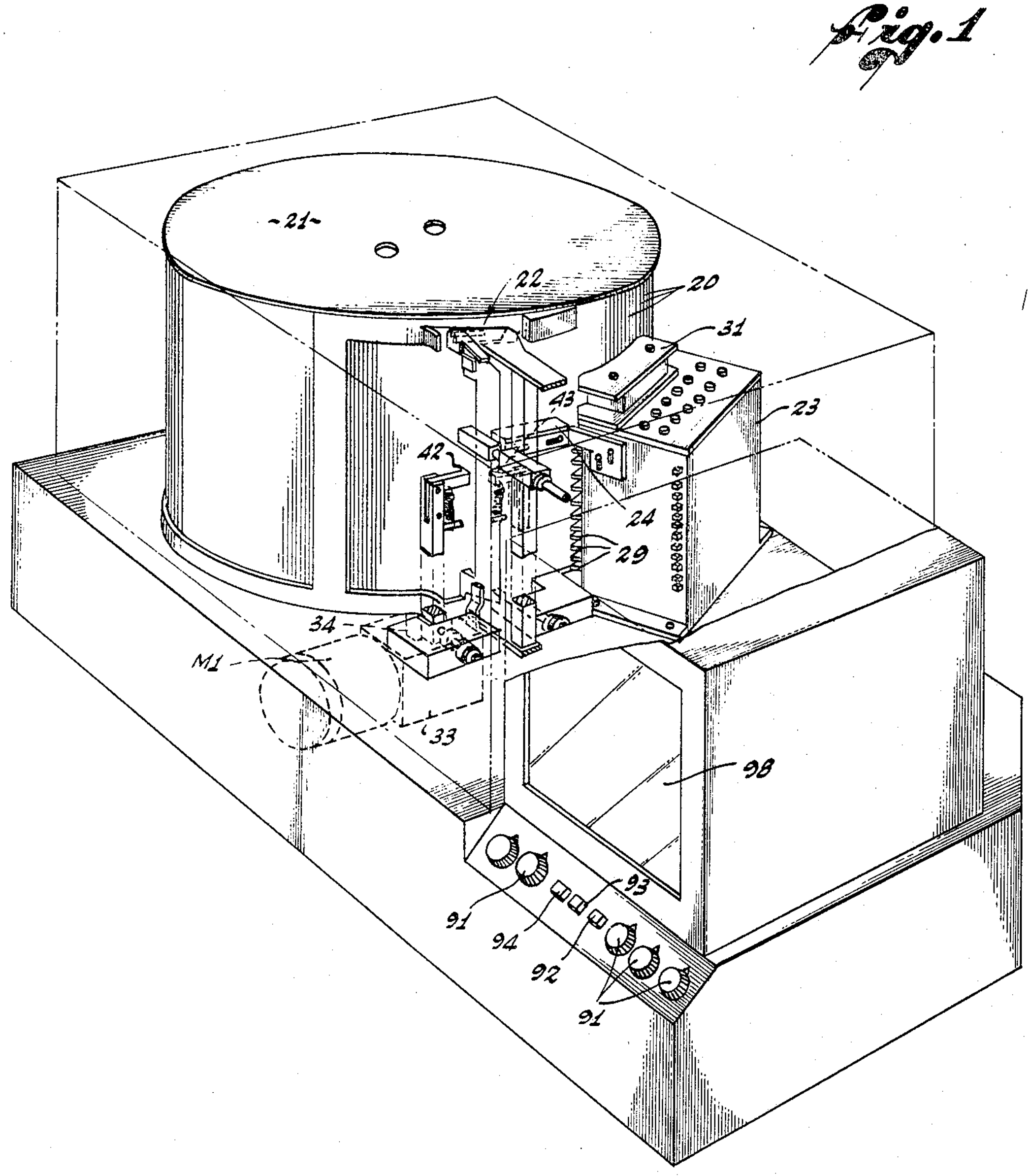
FIGURE 1 is a perspective view with parts broken away of a preferred embodiment of the device according to the present invention.

Referring first principally to FIGURE 1, the card items 20 are stored substantially radially within a rotatable cylindrical drum 21 and access is had to the front edges of the cards around the periphery of the drum with the cards removed from and returned to the drum store at a station indicated generally at 22. The drum 21 rotates in a clockwise direction, as viewed in FIGURE 1, and adjacent its periphery a card-addressing and selecting device 23 is located in advance or "upstream" of the withdrawal and return station 22. A card sensor 24 is located between the selector device 23 and the station 22. The radially extending cards 20 may be held within the drum 21 between stationary and movable backup plates mounted therein and also extending radially thereof, as shown and described in my prior applications identified above.

The forward edges of the cards 20 are of magnetic material at 28 and are provided with forwardly opening coding notches which identify each of the cards uniquely as explained more particularly in the first above-identified copending applications. The addressing and selecting device 23 includes a plurality of pivoted address plates 29, the upper and lower positions of which correspond to digital numbers 0 and 1 to address by their positions a unique card 20 within the drum 21. The edges of the address plate 29 cooperate with the coding notches in the forward edges of the cards 20 to permit an addressed card to be selected and partially withdrawn from the drum store by means of arcuate, non-concentric magnets 31. The selector 23 may be provided with a solenoid-operated arm, as shown and described in the above-identified applications, for holding the cards 20 within the drum while the address plates 29 are changing positions.

Figure 14:
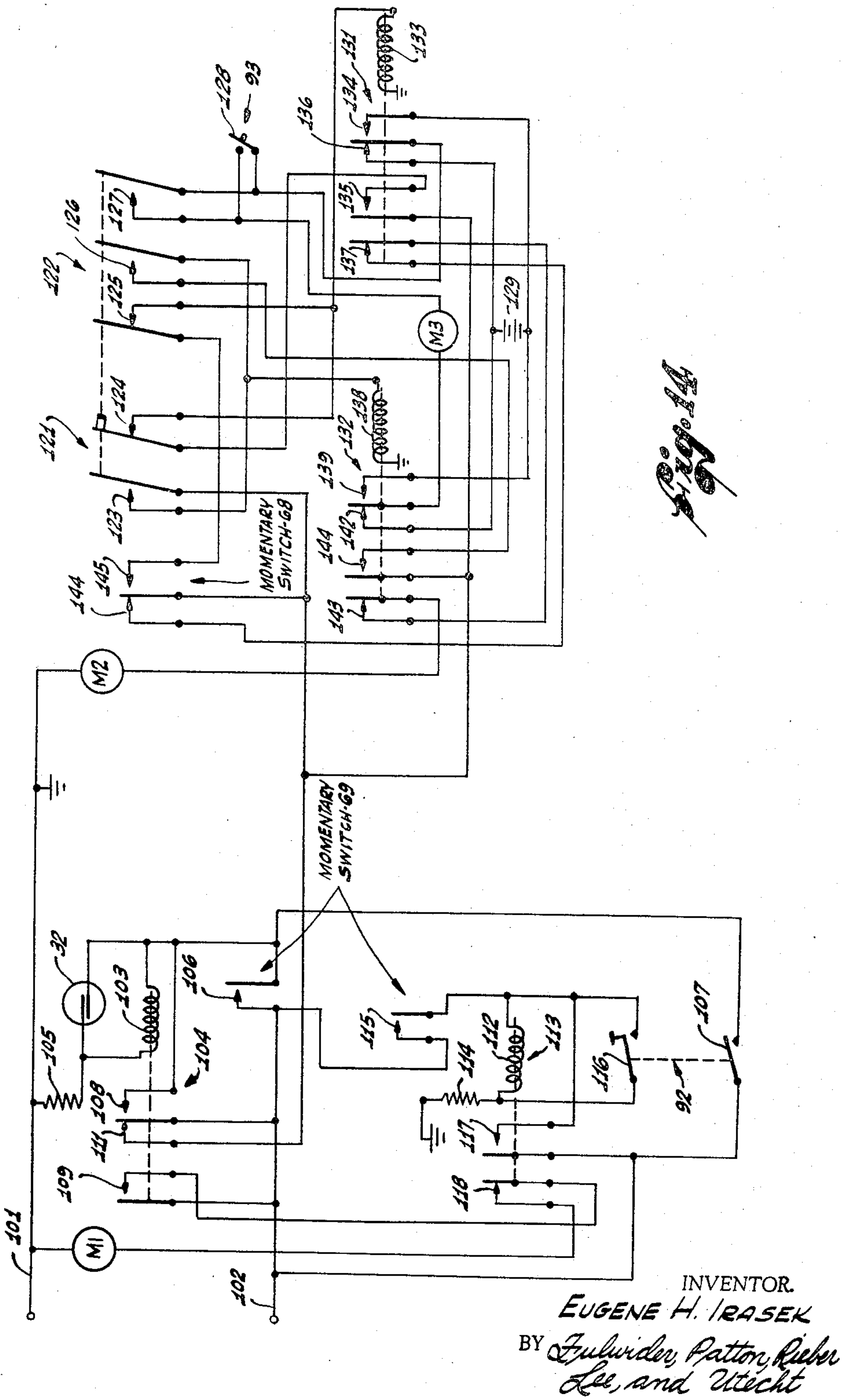
FIGURE 14 is a schematic wiring diagram for the device according to the present invention.

Cards selected by the device 23 and partially withdrawn from the drum store by the magnets 31 are detected by the sensor 24 which is responsive to the magnetic material 28 of the card edge to operate a normally open magnetic reed switch or the like 32 (FIGURE 14). The drum 21 is driven by a motor M1 through a gear box 33 and a shaft 34 on which the drum is mounted.

At the station 22 is located a combined withdrawal and return gate 35 (FIGURES 6–13) having a straight wall 36 on the return side and a curved wall 37 on the withdrawal side separated adjacent the drum 21 by a generally wedge-shaped strip 38 into a card-return passage 39 and a card-withdrawal passage 41. At opposite sides of the gate 35 are mounted card-manipulating wedges 42 and 43 on one end of inverted L-shaped supporting arms 44 and 45, respectively, FIGURE 3. The supporting arms 44, 45 are pivotally mounted in the ends of substantially vertical manipulating arms 46 and 47, respectively, and are normally held in substantially the positions shown in FIGURE 3 by biasing springs 48. The wedge 42 and 43 move freely toward and away from each other past the walls 36 and 37 and through notches in the dividing strip 38.

Figure 2:
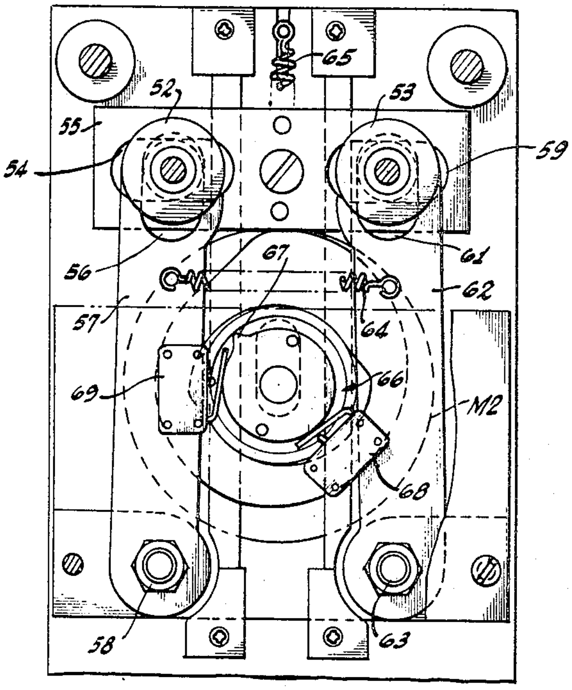
FIGURE 2 is a bottom plan view of operating mechanism for card-separating elements at the withdrawal and return station.
Figure 5:
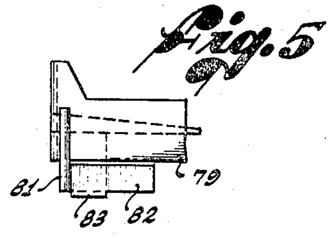
FIGURE 5 is a detailed view in the direction 5 of FIGURE 4.

Each of the manipulating arms 46, 47 is mounted for universal swivelling movement about pivot axes 49 and 51 and have their lower ends disposed in spool-like members 52, 53, respectively. Member 52 is mounted in elongated slots, 54 in a rectilinearly movable bar 55 and 56 adjacent one end of an arm 57 pivoted adjacent its other end at 58. Member 53 is mounted in elongated slots, 59 in the bar 55 and 61 adjacent one end of an arm 62 pivoted adjacent its other end at 63. The arms 57 and 62 are biased toward each other by a spring 64 and the bar 55 is biased downwardly, as viewed in FIGURE 2, by a spring 65. Cams in a common group indicated generally at 66 are rotated by a motor M2 and have cam surfaces cooperating with the edges of the pivoted arms 57, 62 and the bar 55 so as to affect movements of the arms and the bar against their biases, as explained in applicant's first above-identified copending application, to move the members 52 and 53 and rotate arms 46 and 47 about their axes 49 and 51 to affect the movements of the wedges 42, 43 indicated by the arrows 1 through 5 in FIGURE 3. The cam group 66 includes a switch-operating projection 67 rotating therewith and operating in sequence a pair of angularly spaced switches 68 and 69.

Figures 3, 4:
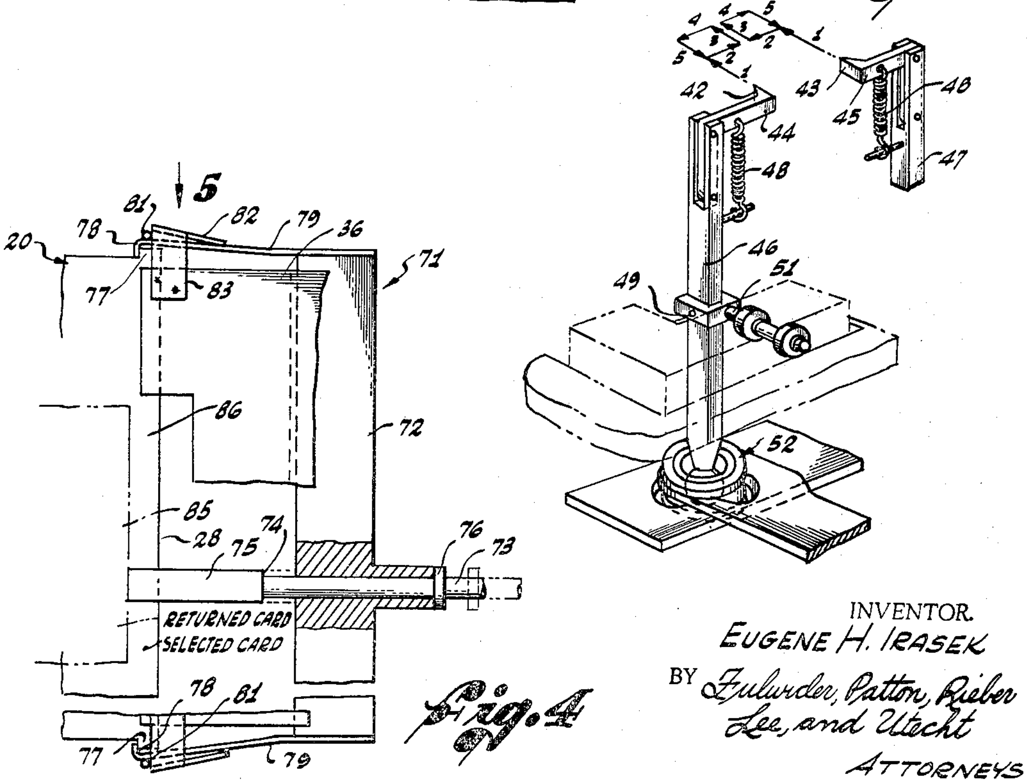
FIGURE 3 is a partial perspective view showing the card-separating elements and the motions given thereto by the mechanism of FIGURE 2.
FIGURE 4 is a partial view of the card-withdrawal and return mechanism.

At the card-withdrawal and return station 22 is a card-manipulating mechanism indicated generally at 71 (FIGURE 4). It comprises a vertical bar 72 mounted for horizontal movement toward and away from the drum 21 by a lost motion connection to a rod 73 through suitable conventional mechanical structure whose details are not important to the present invention and which is driven in opposite horizontal or X directions by a motor M3. The rod 73 extends through the bar 72 and the lost motion is provided between a shoulder 74 at the back of a card pusher head 75 and a disc 76 rigidly mounted on the rod 73.

The cards 20 have upper and lower front edge extensions 77 adapted to be engaged by hook ends 78 directed downwardly and upwardly from the ends' resilient arms 79 mounted to the top and bottom of the vertical bar 72. Each arm 79 has a horizontal pin 81 rigidly mounted thereon at its end adjacent the hook 78 which pins 81 cooperate with small cam plates 82 as the bar 72 moves inwardly toward the drum 21, the pins 81 riding on the inclined surfaces of the cam plates 82 to move the hook ends 78 vertically beyond the card edge extensions 77 to snap therebehind into the position of FIGURE 4 as the pins 81 move past the inward edges of the cam plates 82. The cam plates 82 are rigidly mounted by integral flanges 83 on the gate wall 36 and permit the pins 81 to move freely thereunder in the outward, card-withdrawing movement of the bar 72 and arms 79.

The address plates 29 may be positioned by solenoids, as disclosed in applicant's first copending application identified above, under control of rotary switches 91. Operational push buttons are indicated at 92 and 93 while push button 94 may control the solenoid restricting card movement opposite the selector 23 during movement of the address plates. Power, light, and other control switches may be built in or remotely located. A selected card withdrawn from the drum 21 by card manipulator 74 may be moved in both horizontal and vertical directions by conventional X–Y mechanism, not shown, to place the proper image on the card in the optical path of a light 95 and lens system 96, 97 to project the image on the back of a translucent screen 98 for readout of the image material. The particular readout or other use mechanism forms no part of the present invention and can include any means to retrieve information or the like from the particular items being stored.

Figure 10:
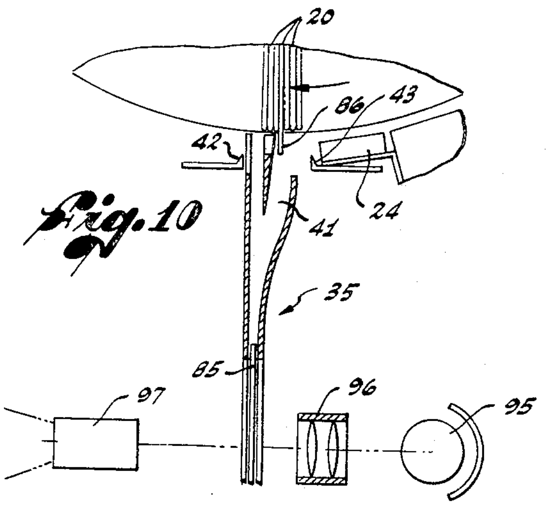
FIGURES 10 and 13 show the operation of positioning the next desired card for withdrawal while a withdrawn card is in use.
Figure 11:
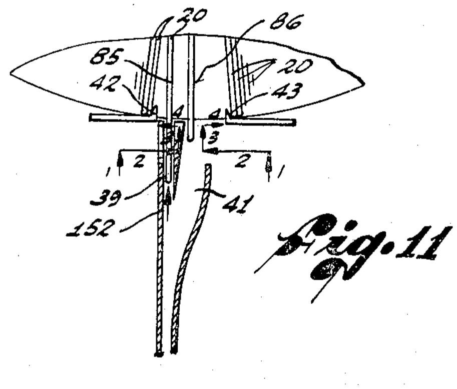
FIGURES 11 and 12 show the positions and movements of the elements of FIGURE 3 and the card movements as a previously withdrawn card is returned and the next card withdrawn from the store by the mechanism of FIGURES 4 and 5.
Figure 12:
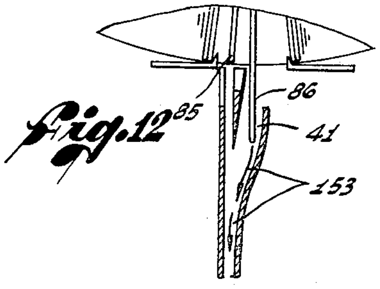
Figure 13:
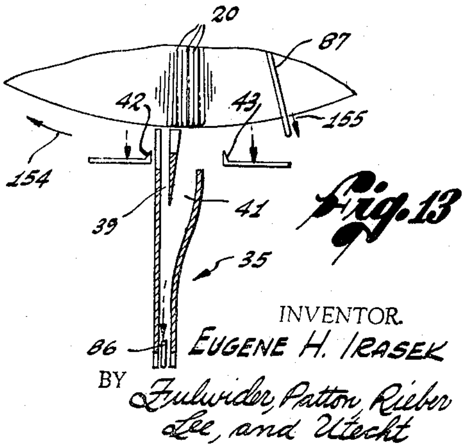

FIGURES 6 through 9 show a selected card 85 in position to be withdrawn from the store, the card 85 having been moved forwardly of the other cards 20 in the drum 21 by the selector 23. FIGURE 10 shows the card 85 positioned in the gate 35 with the desired image in the optical path for projection while the next desired card 86 is shown in withdrawal position opposite the passage 41. FIGURE 11 shows the card 85 being returned to the store through the passage 39. FIGURE 12 shows the card 85 fully returned to the store and the card 86 being withdrawn from the store into the gate 35 through the passage 41. FIGURE 13 shows the card 86 positioned in the gate 35 with the proper image thereon in the optical path while a third desired card 87 approaches the withdrawal position opposite passage 41.

Referring now to the wiring diagram of FIGURE 14, power for the system is supplied across a ground line 101 and a hot line 102. The operating coil 103 of a relay 104 is connected to ground line 101 through a limiting resistor 105 and to the hot line 102 through any of: contact 106 on switch 69, contact 107 on push button switch 92 and its own holding circuit contact 108. The relay 104 also includes a normally open contact 109 and a normally closed contact 111. The operating coil 112 of a relay 113 is connected at one side through a limiting resistor 114 to ground and at its other side to the hot line 102 through any of: contact 115 of switch 69, contact 116 of push button 92, and its own holding contact 117. Relay 113 has a normally closed contact 118. The circuit for motor M1 connects from line 101 through contact 118 and contact 109 to line 102.

A pair of multipole limit switches 121 and 122 are operated by the card manipulator 71 in its opposite extremes of movement, limit switch 121 being operated by card manipulator 71 at its innermost position towards the drum 21 and limit switch 122 being operated at the outermost position of the card manipulator remote from the drum 21. Limit switches 121 and 122 are both shown in the positions they assume when the card manipulator 71 is in its outermost position remote from the drum 21. In limit switch 121, contact 123 was opened and contact 124 closed shortly thereafter when the card manipulator started its outward movement. In limit switch 122, contact 125 was closed and contacts 126 and 127 opened at the extreme outward position of the card manipulator. Push button 93 has contacts 128 paralleling contact 127.

The card manipulator 71 is driven in opposite horizontal directions by a D.C. motor M3 powered by a separate battery source 129 for simplicity of reversal of the direction of rotation of the motor. A pair of relays 131 and 132 are associated with the motor M3, the relay 131 having an operating coil 133 connected at one side to ground and at its other side to contacts 124 and 125 in parallel. Relay 131 has normally open contacts 134 and 135 and normally closed contacts 136 and 137. Relay 132 has an operating coil 138 connected at one side to ground and the other side connected in parallel to contact 123 and the movable contact engaging contact 126. Relay 132 has normally open contacts 139 and 141 and normally closed contacts 142 and 143.

Switch 68 has a normally closed contact 144 connected to contact 137 of the relay 131 and a normally open contact 145 connected to the movable contact which engages contact 125 on limit switch 122.

OPERATION

This description of operation starts with no card withdrawn from the drum and with the card manipulator 71 in its outermost position away from the drum so that the limit switches 121 and 122 are in the positions illustrated in FIGURE 14. Supply power is placed on the lines 101 and 102 and the first card desired is addressed by the switches 91 to locate the plates 29 in accordance with the binary code uniquely identifying and addressing the first desired card, as explained in my first application above-identified. Push button 92 is now depressed to close contact 107 thereby energizing operating coil 103 of relay 104 from the hot line 102 through contact 107, the coil 103 and limiting resistor 104 to ground line 101. Relay 104 now operates, opening contact 111 and closing its holding circuit contact 108 for the coil 103 to the hot line 102.

Had coil 112 been energized, the closing of contact 116 would have deenergized it to drop out relay 113. On start up the coil 112 will already be deenergized so that in any event contact 118 is closed. Operation of relay 104 closes contact 109 and therefore a circuit is established for motor M1 from line 101 through the motor, contact 118 and contact 109 to the hot line 102. The motor M1 therefore starts to rotate the drum 21 in a clockwise direction as viewed in FIGURE 1, moving the front edges 28 of the cards 20 past the selector 23, and when the card addressed by the plates 29 is opposite the selector its coding notches receive the edges of the plates 29 therein and the card is pulled outwardly, a short distance from the drum by the non-concentric magnets 31, as explained in my first application above-identified. This selected card is given the number 85 in FIGURES 6 through 12. When the selected and partially withdrawn card 85 passes the sensor 24, reed switch 32 closes to short out coil 103 thus dropping out relay 104 and opening contact 109 to deenergize motor M1 and stop drum 21 with the selected card 85 opposite the withdrawal passage 41 in the gate 35. The drum may coast or be braked to a stop and in any event the separator 38 prevents the card 85 from moving past the passage 41, as illustrated in FIGURE 6 which in full lines represents the condition reached under the operation so far described.

The dropout of relay 104 closes contact 111 to energize motor M2 from line 101 through contacts 143, 137, 144, and 111 to line 102. Motor M2 therefore starts rotating the cam group 66 to move the arms 57 and 62 and the bar 55 against their biasing springs in accordance with the cam surfaces to move the spool members 52 and 53, thereby rotating the wedge-manipulating arms 46 and 47 to move the wedges 42 and 43 in the sequence illustrated by the arrows numbered 1 through 5 in FIGURE 3, as illustrated further in FIGURES 6 through 10, and as more fully described in my first application above-identified.

Figure 6:
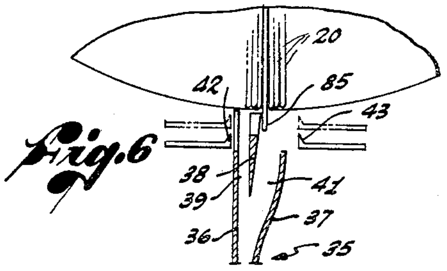
FIGURES 6 through 9 show various positions of the elements of FIGURE 3 in the positioning of a selected card for withdrawal from the store.
Figure 7:
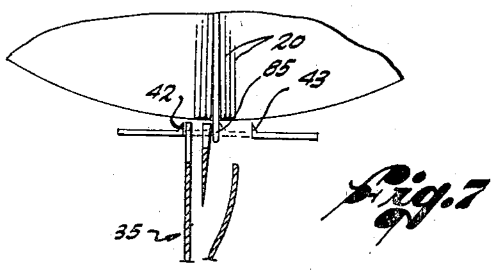
Figure 8:
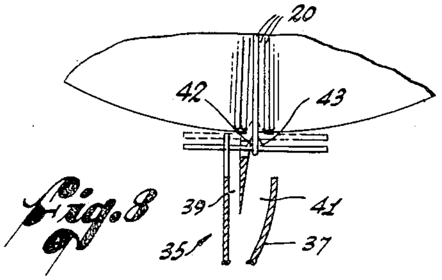

As the cam group 66 rotates, the wedges 42 and 43 are first moved toward the drum, that is, from the full line to the dotted line position of FIGURE 6. The wedges 42 and 43 are then moved toward each other on opposite sides of the card 85, from the full line position to the dotted line position of FIGURE 7. Continued rotation of the cam group now moves the wedges directly inwardly between card 85 and the other cards 20 at the edge of the drum, from the full line to the dotted line positions of FIGURE 8 and then separates the wedges 42 and 43 while they are in their innermost positions, from the full line to the dotted line positions of FIGURE 9, thereby separating the cards at opposite sides of the selected card 85 to give it freedom for withdrawal from the store in the drum (and also to provide a space for insertion of a previously withdrawn card where there is one, as will be later explained).

Figure 9:
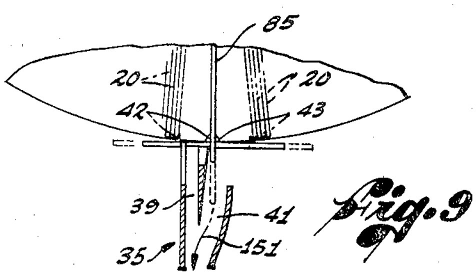

When the wedges 42, 43 reach the card-separated position of FIGURE 9 the switch 68 is momentarily operated by the projeciton 67 on the cam group 68 thereby opening contact 144 and closing contact 145. Opening of contact 144 deenergizes motor M2 to stop rotation of the cam group. Closing of contact 145 energizes the operating coil 133 of relay 131 through contacts 125, 145 and 111 to line 102. Operation of relay 131 closes the holding circuit for its coil 133 through contact 124, its own contact 135, and contact 111 so that on opening of contact 145 relay 131 remains closed. Push button 93 is now operated to close contacts 128 to establish a circuit to motor M3 on the one side through contact 128, contact 134 to the battery 129 and on the other side through contact 142. Motor M3 therefore rotates to move the card manipulator 71 inwardly and with initial movement limit switch 122 operates to close contacts 126 and 127 and open contact 125, contact 127 forming a holding circuit about contacts 128 which may now be released. Motor M3 continues to operate until the card manipulator 71 reaches its innermost position where it operates limit switch 121 to first open contact 124 and then close contact 123.

If a withdrawn card had been in the gate 35, the inward movement of the card manipulator 71 would have returned it to the drum store thorugh the gate passage 39 by the head 75 engaging the forward edge 28 thereof as in FIGURE 11 where the card 85 is being returned. In its innermost position the card manipulator 71 engages the front edge extensions 77 on the card 85 by the hooks 78, the pins 81 and cam plates 82 moving the hooks clear of the card extensions as the hooks move inwardly.

Opening of contact 124 opens the circuit through contact 135 for the operating coil 133 so that relay 131 drops out to deenergize motor M3 at contact 134. Closing thereafter of contact 123 energizes the operating coil 138 of relay 132, the circuit being completed through contacts 123 and 111. Relay 132 therefore closes and forms a holding circuit for its operating coil 138 through contacts 111, 142 and 126. Closing of contact 139 connects the motor M3 to the battery 129 in reverse polarity, one side of the motor M3 being connected through contact 139 to the opposite side of the battery to which it was previously connected, and the other side being connected to the battery through contact 127 and 136. Motor M3 now rotates in the reverse direction to move card manipulator 71 outwardly away from the drum 21, pulling card 85 with it, as indicated in dotted lines in FIGURE 9 and by the arrow 151 therein. Limit switch 121 operates to the position of FIGURE 14 as soon as the card manipulator 71 starts outwardly but the opening of contact 123 does not affect the energization of coil 138 which remains effected through contacts 126 and 141. Closing of contact 124 is ineffective because contact 135 is open.

At the outermost position of the card manipulator 71, the limit switch 122 operates to the position shown in FIGURE 14, thereby deenergizing operating coil 138 at contact 126 so that relay 132 drops open to deenergize motor M3 at contact 139. The dropout of relay 132 also closes contact 143 so the circuit to motor M2 is now established through contacts 143, 137, 144 and 111. Motor M2 now rotates the cam group 66 to move the spool members 52, 53 so that the wedges 42, 43 move straight outwardly from the position of FIGURE 9 into the position of FIGURE 10 at which point switch 69 operates to momentarily close contacts 106 and 115. Closing of contact 106 energizes the operating coil 103 of relay 104 which closes to form a holding circuit for itself through contact 108, the circuit to motor M2 being broken at contact 111 so that rotation of the cam group 66 stops. Closing of contact 115 energizes the operating coil 112 of relay 113 which operates to close a holding circuit contact 117 and to open contact 118 thereby preventing energization of motor M1 when contact 109 is closed by relay 104.

At the extreme outermost position of the manipulator 71 the card 85 may be released by means not shown and the card manipulated in the gate 35 by X–Y mechanism of any desired form, not forming a part of this invention, to locate the desired image on the card in the optical path for projection. Alternatively, in the outermost position of the card manipulator the card can be removed entirely from the gate for whatever reproductive or other use it may be desired to make of it. As an example only, the card 85 is shown in FIGURE 10 in a projection position in the gate 35.

The address of the next desired card 86 is now placed on the address plates 29 of selector 23 by the switches 91, after which push button 92 is operated and the closing of contact 116 shorts the operating coil 112 to drop out the relay 113 thereby closing contact 118 and energizing motor M1 to rotate the drum 21 and move the front edges of the cards 20 past the selector 23. When the addressed card 86 comes opposite the selector 23 it is partially withdrawn from the drum store and rotates until it is sensed by the sensor 24 whereupon the reed switch 32 closes to short out operating coil 103 and drop out relay 104. This opens contact 109 to deenergize motor M1 and stop the drum 21 with the next desired card 86 positioned opposite the withdrawal passage 41 in the gate 35, as shown in FIGURE 10, the card 85 remaining in the gate 35.

The card-separating wedges 42 and 43 now move through the motions previously described, as illustrated in FIGURES 6 through 9 and represented by the arrows 1 through 4 in FIGURES 3 and 11, these movements being initiated by the energization of motor M2 through contacts 143, 137, 144 and 111 when relay 104 drops out and being terminated by the opening of contact 144 of momentary switch 68, with the cards 20 separated from the next desired card 86 in the manner shown in FIGURE 11.

Closing of contact 145 of switch 68 energizes the coil 133 of relay 131 which operates to close a holding circuit through its contact 135, contact 124, and contact 111 of relay 104. However, since both contacts 127 and 128 are open at this time motor M3 is not energized and the device remains with the card 85 in the gate 35 and the card 86 opposite the passage 41. The separation of the cards 20 from the card 86 in FIGURE 11 also opens the space in the drum opposite the passage 39 so that the previously withdrawn card 85 may be easily returned into the drum store between the manipulating wedge 42 and the card 86.

When the use of the card 35 is completed, push button 93 is operated to close contacts 128 thereby energizing motor M3 to move card manipulator 71 inwardly, contact 127 immediately closing to form a holding circuit about contacts 28 so that push button 93 may be released. Pusher head 75 now engages the edge 28 of card 85 and pushes it through the passage 39 of gate 35, as indicated by the arrow 152 of FIGURE 11. At the conclusion of the inward stroke of the card manipulator 71 the card 85 is fully returned into the drum, in the position of FIGURE 12, and the hooks 78 are in back of the front edge extension 77 on the card 86, as previously explained for card 85. Limit switch 121 is operated to reverse the polarity of the supply to motor M3, as previously described, and the card manipulator 71 moves to its outermost position, pulling the card 86 with it through the passage 41, as indicated by the arrows 153 in FIGURE 12. With the card 86 fully withdrawn into the gate 35 and the limit switch 122 operated in the extreme outward position of the card manipulator 71, the condition is the same as at the conclusion of the withdrawing operation of FIGURE 9 but with the card 86 in the gate 35, as indicated in FIGURE 13.

The address of the card desired for manipulation after card 86, which has been designated 87 in FIGURE 13, is now placed on the plates 29 in the selector 23 and the push button 92 is again operated, thereby closing contact 116 to short out coil 112 and drop out relay 113. Closing of contact 107 energizes operating coil 103 to pull in relay 104, closing contact 109 to energize M1 through contacts 109 and 118. This rotates drum 21 as indicated by the arrow 154 in FIGURE 13, the card 87 as it passes the selector 23 being partially withdrawn from the drum store, as previously described and as indicated by the arrow 155 in FIGURE 13. When the card 87 is sensed by sensor 24 motor M1 will be deenergized and the card 87 stopped opposite the passage 41 in the gate 35, the cards 86 and 87 now occupying the positions previously occupied by cards 85 and 86, respectively, in FIGURE 10. The operation of the wedges 42 and 43 through the motions indicated by the arrows 1, 2, 3, 4 of FIGURE 11 now take place to separate the cards 20 from the card 87 and the operation is finally stopped with the card 86 in the gate 35, the card 87 opposite the withdrawal passage 41, and with the cards 20 separated from the card 86 in the manner of FIGURE 11.

Cards 86 and 87 remain in this position until push button 93 is operated to return the card 86 to the drum store as was the card 85 and to withdraw the card 87 as was the card 86. The operations continue with the selecting and withdrawal of future desired cards in the manner above-described, the device looking ahead to place the next desired card opposite the withdrawal passage in the gate and to separate the drum cards 20 therefrom in the position of FIGURE 11. When use of the withdrawn card is completed it can be readily returned to the space opened in the drum therefor and the next desired card immediately withdrawn from the drum by a withdrawal stroke immediately succeeding the inward stroke returning the previously withdrawn card.

It is therefore seen that the described device effects material saving in operating time by overlapping the use of the previous card with the selection and positioning for withdrawal of the next card desired. A new card is selected and placed in position for withdrawal during the dwell time while the previously withdrawn card is being used or manipulated. Except for addressing the successive cards at the switches 91 and operating the push buttons 92 and 93 the sequences of the device are carried out automatically and the return of a previously withdrawn card to the store is followed by the immediate withdrawal of the next desired card, after which a new card to be recalled is addressed, selected and positioned for withdrawal.

What is claimed is:

1. A random access storage and retrieval device for card type items comprising:

storage means for holding a plurality of said items in side-by-side relation;

means on said items for uniquely identifying each of said items;

selector means associated with said storage means for addressing said items in accordance with their unique identifying means;

means for effecting relative movement transversely of said items between said storage means and said selector means for identifying an addressed item;

means for locating said addressed and identified item in a withdrawal position;

means for withdrawing and returning an item addressed and identified by said selector means from said storage means;

means including said selector means and movement effecting means for addressing and identifying a next desired item while a first item is withdrawn from said storage means;

means for locating said identified next desired item in withdrawal position while said first item remains withdrawn from said storage means;

and means manipulating said item withdrawing and returning means to return a withdrawn item to the storage means adjacent said next desired item and immediately withdrawing said next desired item from the storage means.

2. The random access storage and retrieval device defined in claim 1 in which:

said selector means and item withdrawing and returning means are substantially stationary with respect to transverse movement, and said storage means and items are moved transversely relative to said selector means and said item withdrawing and returning means.

3. The random access storage and retrieval device defined in claim 1 including:

a stationary gate having withdrawal and return passages therein;

means positioning an addressed and identified item adjacent the withdrawal passage in said gate while the previously withdrawn item remains out of said storage means;

and said item withdrawing and returning means returning the previously withdrawn item through said return passage in said gate into the storage means and thereafter withdrawing said next desired item through said withdrawal passage in said gate without intermediate relative movement between said storage means and said gate.

4. The random access storage and retrieval device defined in claim 3 including:

means for separating the items in the storage means from an identified next desired item positioned adjacent said withdrawal passage to free the identified item for withdrawal and also providing an open space in the storage means alongside said identified item for return of the previously withdrawn item into the storage means through said open space.

5. The random access storage and retrieval device defined in claim 1 in which said item withdrawing and returning means includes:

item pushing means for returning a previously withdrawn item into the storage means;

item engaging means for withdrawing the next desired and identified item from the storage means;

a lost motion connection between said pushing and engaging means to insure complete insertion of a returned card into the storage means;

and means for moving said item engaging means out of interfering relation with the items while permitting engagement thereafter between said engaging means and said identified next desired item.

6. The random access storage and retrieval device defined in claim 1 including:

manual means for setting the addressing means of the selector means;

manual means for initiating relative movement between said storage means and said selector means;

manual means for initiating the return movement of said item withdrawing and returning means;

and automatic means for effecting all other operations in the sequence of returning a previously withdrawn item, immediately withdrawing the next desired item and identifying and positioning for withdrawal a third desired item while said second desired item remains withdrawn from the storage means.

7. The random access storage and retrieval device defined in claim 1 including:

manual means for initiating return movement of said item withdrawing and returning means;

means for addressing, identifying and positioning the next desired card for withdrawal from said storage means in the interval between withdrawal of the previous item from the storage means and operation of said manual means;

and means whereby upon initiation of said manual means said card withdrawing and returning means will initiate a return and withdrawal movement to return the withdrawn item and withdraw the next desired item from the storage means immediately therefter.

8. The random access storage and retrieval device defined in claim 7, including:

means for separating the items in the storage means from an identified item positioned for withdrawal;

and means for directing an item being returned by said item withdrawing and returning means into the storage means alongside of said identified item positioned for withdrawal.

9. The random access storage and retrieval device defined in claim 8, including:

means for automatically operating said item separating means to enter the storage means at opposite sides of an identified item positioned for withdrawal each time an item is so positioned and move the items on opposite sides of said identified and positioned item away from it, thereby facilitating both insertion of a previously withdrawn item alongside the newly identified and positioned item and the withdrawing of said newly identified and positioned item.

10. The random access storage and retrieval device defined in claim 9, including:

means for withdrawing said item separating means from the storage means after withdrawal of an item therefrom to provide for relative movement between the storage means and the selector means and the identification and positioning of a new item for withdrawal from the storage means;

and means thereafter again manipulating said item separating means to enter and separate the adjacent items from the now newly identified and positioned item.

11. The random access storage and retrieval device defined in claim 10, including:

means automatically stopping the sequence of operation of the device with an item withdrawn from the storage means, the next desired item identified and positioned for withdrawal, and the items at opposite sides of said identified and positioned item separated therefrom;

and manual means for initiating a sequence of operations to return the withdrawn item back into the storage means alongside said identified and positioned item and immediately withdrawing said identified and positioned item from the storage means.

12. The random access storage and retrieval device defined in claim 11, including:

additional manual means for initiating relative movement between said storage means and selector means to identify the next succeeding desired item in the storage means and position said next succeeding desired item in position for withdrawal while the immediately preceding withdrawn item remains outside of the storage means.

References Cited

UNITED STATES PATENTS 3,313,055 4/1967 Irasek ------------ 129—16.1 X

JEROME SCHNALL, Primary Examiner